(12) United States Patent
Golben

(10) Patent No.: US 8,114,363 B1
(45) Date of Patent: Feb. 14, 2012

(54) LIQUID AND GASEOUS FUEL PRODUCTION FROM SOLAR ENERGY

(75) Inventor: P. Mark Golben, Florida, NY (US)

(73) Assignee: Ergenics Corporation, Ringwood, NJ (US)

(*) Notice: Subject to any disclaimer, the term of this patent is extended or adjusted under 35 U.S.C. 154(b) by 259 days.

(21) Appl. No.: 12/345,192

(22) Filed: Dec. 29, 2008

Related U.S. Application Data

(63) Continuation-in-part of application No. 12/053,279, filed on Mar. 21, 2008, and a continuation-in-part of application No. 11/644,693, filed on Dec. 22, 2006, now abandoned, and a continuation-in-part of application No. 11/209,161, filed on Aug. 22, 2005.

(60) Provisional application No. 61/009,474, filed on Dec. 29, 2007, provisional application No. 60/921,030, filed on Mar. 31, 2007, provisional application No. 60/845,129, filed on Sep. 16, 2006, provisional application No. 60/854,278, filed on Oct. 25, 2006.

(51) Int. Cl.
*B01J 8/00* (2006.01)
*C07C 27/00* (2006.01)

(52) U.S. Cl. ........ 422/600; 422/630; 422/631; 422/198; 518/702

(58) Field of Classification Search .................. 422/600, 422/630, 631, 198; 518/702
See application file for complete search history.

(56) References Cited

U.S. PATENT DOCUMENTS
2002/0025457 A1* 2/2002 Dodd et al. ................. 429/9
* cited by examiner

*Primary Examiner* — Jennifer A Leung
(74) *Attorney, Agent, or Firm* — Vangelis Economou; Economou IP Law

(57) ABSTRACT

A system for and method of conversion of electrical energy into gaseous and liquid fuels, comprising steps of and means for provide a hydrocarbon fuels, including a collector for collecting carbon dioxide gas from a carbon dioxide gas source, a means for reducing at least a portion of the collected carbon dioxide gas to carbon monoxide, a means for producing hydrogen from a hydrogen source and a vessel for thermochemically reacting the hydrogen gas with carbon dioxide in a Fischer-Tropsch type process in the presence of a catalyst and heat.

2 Claims, 6 Drawing Sheets

Step 1

Step 2

LIQUID AND GASEOUS FUEL PRODUCTION FROM SOLAR ENERGY

CROSS REFERENCE TO RELATED APPLICATIONS

This is a non-provisional of Provisional Application No. 61/009,474 filed on Dec. 29, 2007 and is a continuation in part of 12/053,279 filed Mar. 21, 2008, which claims domestic priority to U.S. Provisional Patent Application Ser. No. 60/921,030 filed on Mar. 31, 2007, and pending U.S. Non-provisional application Ser. No. 11/209,161, filed on Aug. 22, 2005 and also is a continuation in part of U.S. patent application Ser. No. 11/644,693, filed Dec. 12, 2006 now abandoned, which is a non-provisional of Provisional Application No. 60/845,129, filed on Sep. 16, 2006 and of Provisional Application No. 60/854,278, filed on Oct. 25, 2006, all of which applications are incorporated by reference as if fully set forth herein.

BACKGROUND OF THE INVENTION

1. Field of the Invention

This invention relates generally to devices that convert solar and/or waste heat energy to electricity, the electricity in turn being used in an electrolysis process to make hydrogen gas from water, which hydrogen then in turn is used to make gaseous and liquid fuels via the reaction of hydrogen gas with $CO_2$ gas when exposed to the presence of heat, temperature and/or catalytic materials. More specifically, it relates to devices that use metal hydride heat engine technology to convert the solar and/or waste heat energy into electrical energy which in turn is used to make Hydrogen gas via the electrolysis of water, which then in turn is used to make gaseous and liquid fuels via the reaction of the hydrogen gas with $CO_2$ gas when exposed to the presence of catalytic materials and/or heat and temperature.

2. Background Art

Thermal hydrogen compressors for a broad range of applications have been known for over twenty years. Thermal compression of hydrogen using reversible metal hydride alloys offers an economical alternative to traditional mechanical hydrogen compressors. Hydride compressors are compact, silent, do not require dynamic seals or excessive maintenance and can operate unattended for long periods. When powered by "waste" heat, total energy consumption is only a fraction of that required for mechanical compression, which reduces the cost of hydrogen production and increases energy use efficiency. The simplicity and passive operation of the thermal compression process offer many advantages over mechanical compressors. Hydrogen compressors of this type are described in U.S. Pat. No. 4,282,931 and commonly owned U.S. Pat. Nos. 4,402,187; 4,505,120; 5,450,721; 4,781,246; 4,884,953; 5,623,987 and 6,508,866, the disclosures of which are all incorporated by reference herein, as appropriate.

The common thread in all of the heretofore known hydride compressor technologies is the use of metal hydrides to absorb and release hydrogen at predesignated appropriate times in the hydriding/de-hydriding cycle so as to compress the hydrogen to ever higher pressures. Hydrogen pressure in a metal hydride is known to increase exponentially with increasing temperature. The pressure rise generated in a single stage hydride heat exchanger may be as high as 300%. Although theoretical pressure increase is calculated to be as much as 500%, natural inefficiencies, such as heat transfer resistance and hydrogen pressure drop, tend to reduce the increase in actual practice.

The high pressure hydrogen gas generated by the hydride compressor can be expanded through a turbine/electric generator type of device to produce shaft power and electric power. Electric power plants are capable of converting the high-pressure steam or water pressure created in a generator at a dam into electricity. Other methods, for example, direct solar to electricity conversion in solar panel or battery power, can be used to generate an initial amount of electricity to run an electrolyzer for converting water into oxygen and more importantly hydrogen in an electrolysis process resulting in the production of and oxygen gas. The hydrogen is then used in further processing, as will be explained below in further detail.

When a repeating cycle of hydrogen absorption and desorption is used in a heat exchange cycle, as in, for example, aforementioned U.S. Pat. Nos. 5,450,721, and 5,623,987 and in U.S. Published Application No. 2005/0274138, hydrogen absorption in a metal hydride alloy as used in heat exchange units is known to be accompanied by a heat of formation which is exothermic. In order to continuously absorb hydrogen to an alloy's maximum capacity, heat must be removed from the bed at an appropriate stage in the cycle. The rate at which a hydride alloy can absorb or release hydrogen is dependent upon the rate at which heat can be transferred into or out of the alloy. Increasing the heat transfer rate will allow the processing of higher flow rates, or alternatively, the same flow rate can be processed by proportionately smaller amounts of alloy. Therefore, small containers capable of rapid heat transfer can handle high flow rates. Alternatively, containers having high surface to volume ratios, such as those described in aforementioned U.S. Pat. No. 5,623,987, may be utilized to simultaneously provide rapid heat and hydrogen transfer through the system.

More recently, photovoltaic technology has long been known to convert solar energy directly into electricity. In ongoing research, government agencies, laboratories and private companies endeavor to make this technology commercially viable and historically have met with limited success. These efforts are taking on new urgency and are expected to multiply in view of the world's appetite for energy and depletion of natural gas and petroleum resources. The search for such alternative energy production has also become critical in view of the need to reduce carbon emissions so as to protect the worldwide environment from climate change due to a general warming of the world's troposphere.

Using the electricity produced by solar photovoltaics in an electrolyzer to produce Hydrogen gas is also well known. However, a unitary system or process wherein hydrogen derived from electrolysis and then reacting it with carbon dioxide to make gaseous and liquid fuels has not yet been posited, despite recognized promise to remove carbon from the atmosphere and the production of fuels without utilizing carbon emission fuels from the ground.

SUMMARY OF THE INVENTION

The economic utilization of solar thermal for electric power generation has long been recognized as a possible solution to the world's quest for an alternative form of energy. Several characteristics of solar energy provide unparalleled features that make solar power desirable as an energy source. Besides being the primary and ultimate source of most forms of naturally occurring energy used as a matter of course, solar and thermal energy is freely available in most areas of the world on a year round basis, is abundant, has economic efficiency and lacks most detrimental environmental effects, such as pollution and green house emissions and other harmful effects to the environment. Energy experts have opined that solar energy has the potential to easily supply all of the world's energy needs in manner that minimizes the harmful effects of environmental damage and is locally produced so that the economy is not impacted.

The use of a hydride heat engine to convert the thermal energy in solar and/or waste heat into electricity was the subject of non-provisional U.S. patent application Ser. No. 11/644,693 filed on Dec. 12, 2006. Electric power from a heat engine made according to the aforementioned '693 application and using it to electrolyze water to make hydrogen and oxygen gas, and then completing the reaction of the hydrogen gas with an appropriate amount of Carbon Dioxide to make gaseous and liquid fuels via the use of Fischer-Tropsch processes in a single unified system is not available in the prior art.

Heat engine and photovoltaic technology has long been known to convert solar energy directly into electricity. Currently, many companies endeavor to make this technology commercially viable. Other processes use, for example, the high pressure hydrogen developed in the process according to the aforementioned '693 application, also assigned to the assignee of this invention and described therein utilizes the method to produce electricity solely form solar energy, or waste heat.

In addition, the process of using electricity produced by heat engines and solar photovoltaic cells to produce Hydrogen gas in an electrolyzer is also well known. In effect, the solar powered electrical source is utilized to power an electrolysis mechanism that separates water into its constituent hydrogen and oxygen atoms and then collects the gas for further processing. The efficiency is increased in respect of the system if the power comes from a photovoltaic or other solar powered source, but this is not crucial to the structure and operation of the present invention.

The F-T process of using metal and/or metal oxide catalysts in the presence of heat and temperature to convert gaseous, liquid and solid fuels, such as methane, petroleum oil and coal, into Hydrogen and Carbon Monoxide gas, and then into different forms of gaseous and liquid fuels is well known and was first reduced to production type quantities in the 1940s by Germany during WWII. This process is now known world-wide as the "Fischer-Tropsch" process.

Extraction of Carbon Dioxide from the surrounding ambient air via hydride refrigeration techniques or by using other suitable processes. For example, carbon dioxide may be obtained by conventional chemical reactions processes, and even more efficiently, may be obtained by utilizing waste carbon dioxide that has been recaptured in carbon sink processes that are being implemented to recapture carbon byproducts before they are emitted into the atmosphere.

After the carbon dioxide has been isolated, it is reacted it with the hydrogen gas that itself may be generated by the solar powered heat engine and/or photovoltaic means, the reaction proceeding in a variation of the Fischer-Tropsch process, that will result in the economic production of gaseous and liquid type fuels. Modification of the classic F-T process is required because the staring material is carbon dioxide, rather than carbon monoxide, but the removal of an oxygen atom, from carbon dioxide is a known process.

The present invention combines known technologies from the field of carbon dioxide production and from carbon chain building which in combination have produced a new invention comprising a solar or thermal powered reaction process which can generate gaseous or liquid fuels. Moreover, if the carbon dioxide gas has been generated by extracting it from the ambient air by following the methods of the invention so as to reduce the carbon dioxide as a greenhouse gas, then the gaseous and liquid fuels produced by these processes can truly be considered carbon neutral.

To provide for the necessary teaching of the invention, there is taught and claimed herein a method of conversion of electrical energy into gaseous and liquid fuels, comprising collecting carbon dioxide gas from a carbon dioxide gas source, reducing at least a portion of the collected carbon dioxide gas to carbon monoxide, producing hydrogen from a hydrogen source, thermo-chemically reacting the hydrogen gas with carbon dioxide in a Fischer-Tropsch process to produce gaseous and liquid fuels. In a further modification of the process, the hydrocarbon products of the Fischer-Tropsch process may be further processed to produce solid type fuels, such as waxes, tars and other solid carbon-hydrogen "fuels" that can permanently sequester the carbon they contain.

BRIEF DESCRIPTION OF THE DRAWINGS

The present invention will now be discussed in further detail below with reference to the accompanying figures in which.

A detailed description of the preferred embodiments follows.

DETAILED DESCRIPTION OF THE PREFERRED EMBODIMENTS

Figure 1:
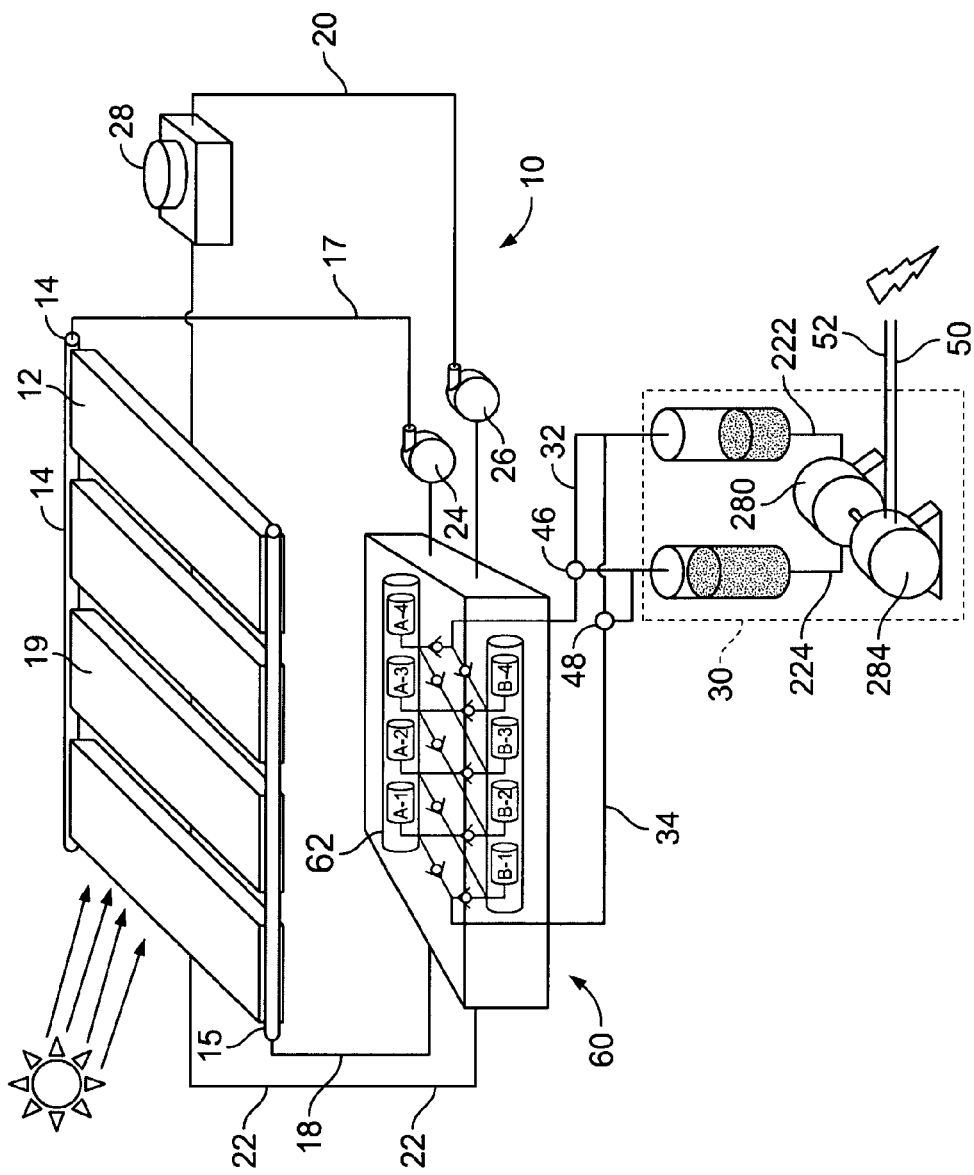
FIG. 1 is a schematic diagram view of a hydrogen compressor utilizing a solar thermal energy source according to the present invention.

Referring now to FIG. 1, a multi-stage heat exchange system 10 according to the present invention is illustrated showing in schematic outline the elements of the system, with heat being provided in the form of radiation form the sun. The multi-stage heat exchange system 10 comprises a solar hot water panel heat collector 12, which may be conventional, as shown. Alternatively, the collector may have characteristics that will enhance the energy collection efficiency or concentration, for example, such as that provided by solar energy collectors shown and described in U.S. Pat. No. 4,002,499 to Winston, as well as others.

The collector may comprise a simple array of pipes 17, 18, a transitional portion of which is embedded in a black, or solar energy absorbing, matrix 19, such as those used in conventional solar water heaters. A heat transfer fluid inflow pipe 17 permits water, or another heat transfer material, to flow into the solar collector 12 through a pipe manifold 14, as shown, where the water is heated by the solar energy collected in the collector 12. The water or heat transfer medium then flows out as hot water, at a temperature of about 85-95° F., through a second pipe 18 connected to a manifold 15 at the opposite, or hot, end of the solar collector 12. Pipe 18 is itself in fluid communication with a hydride bed array 60, as will be described in greater detail below with reference to the description of FIG. 4 below.

A source of cold water may also be provided through a second series of pipes 20, 22 that are in fluid communication with the hydride bed array 60, to provide for a cold source to drive the hydrogen pressurization process. The pipes 20, 22 comprising the cold water loop may also provide for cooling of the fluid heat transfer medium, for example, water, by passing the fluid through an optional cooling fan device 28 or other type of cooling arrangement. Alternatively, the cold water may be obtained from a municipal tap, and after performing its cooling function in the hydride bed array 60, it may be vented to the environment or directed to a drain (not shown). Pumps providing for heat transfer of the fluid medium, for example pumps 24, 26, may be utilized for fluid circulation of the hot and cold heat transfer medium through the closed loop system of either the hot or cold heat transfer medium pipes 17, 18 or 20, 22, respectively. Additionally, a fan cooler 28 in line with the pipe 17 may be utilized to cool off the water or other heat transfer medium that is used on the "cold" side of the multi-stage compressor, as will be described in greater detail with reference to FIG. 4, below.

While the elements of the system 10 are shown schematically in FIG. 1, those having ordinary skill in the art will understand the proper configuration of such a continuous loop system. For example, the hot water outflow pipe 18 may include an insulating wrap around it to maintain the water temperature as high as possible during the transport to the "hot" hydride chambers in hydride bed array 62 (FIG. 4) disposed within the multistage hydride compressor 60. Insulation would assuredly be required for a system where the solar energy is concentrated, as described in aforementioned U.S. Pat. No. 4,002,499, and special piping and heat transfer fluid would also be required, since the temperatures achieved by such a solar energy concentrator may exceed 600° F.

Figure 2A:
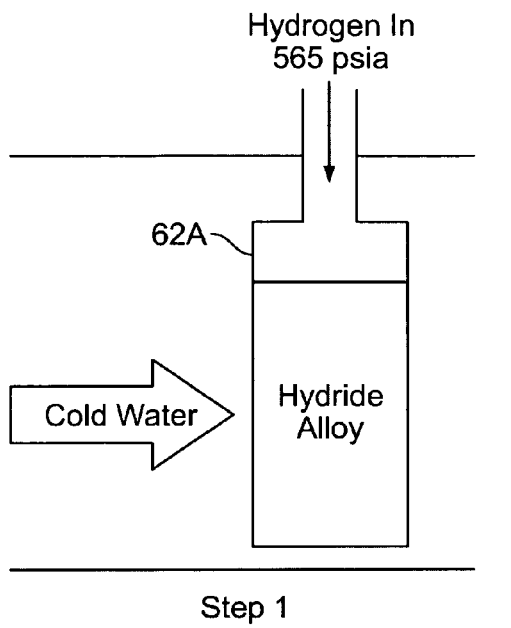
FIGS. 2A and 2B represent schematic diagrams of a simplified hydrogen compressor mechanism according to the present invention showing the two-step process for increasing the pressure of hydrogen gas in the compressor chamber.
Figure 2B:
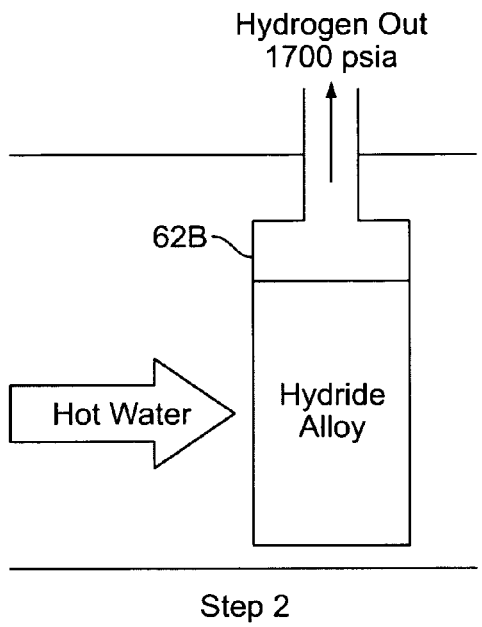

Referring again to FIG. 1, the high pressure hydrogen gas generated by the hydride bed array 62 within the multistage hydride compressor 60 is in fluid communication with a hydraulic motor generator 30 through hydrogen gas pipes 32, 34, as shown. A high pressure pipe 32 provides hydrogen at ultra high pressures to the hydraulic motor generator 30, as is described in greater detail below with reference to FIG. 4, and a return pipe 34 returns the depressurized hydrogen gas to the multi-stage pressurization thermal compressor 60, as shown. The high pressure hydrogen gas may be controlled by valves, two valves 46, 48 of which are shown, to provide the driving impetus to the hydraulic motor generator 30, described in greater detail with reference to the generator 30 illustrated in FIG. 5 below. As shown in FIG. 1, the resulting energy produced by the system may be in the form of electrical power output through a set of lead wires 50, 52. Referring now to FIGS. 2A and 2B, a hydride chamber 62A or 62B (FIG. 4) is shown that may be in fluid communication with an opposite one of the chambers 62A, 62B, so that when one chamber, for example, 62A, is attracting the inflow of hydrogen gas because of the cold water to which it is exposed, the other end of the dual chamber arrangement, for example, 62B is degassing the hydrogen because it is exposed to a hot water pipes 14, 20 (FIG. 1), as shown schematically in FIGS. 2A and 2B.

Figure 3:
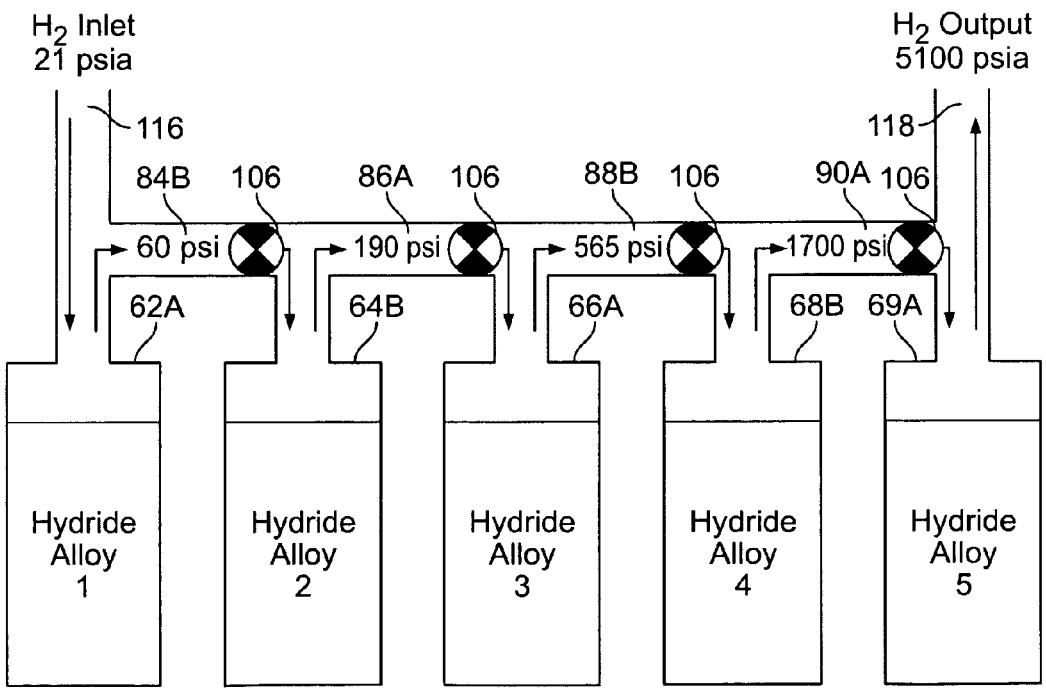
FIG. 3 is a schematic diagram of a high-pressure hydrogen compressor according to the present invention utilizing successive plural mechanisms as shown in FIGS. 2A and 2B.

Referring now to FIG. 3, successive hydride beds are shown as an example of how providing hydride alloys capable of absorbing hydrogen at differing temperatures to provide staged or stepped increases in the hydrogen pressure may be utilized to exponentially multiply the pressure of the hydrogen gas in the multi stage thermal compressor arrangement 60. By successively running cold and hot water to pipes that are in contact with the different hydride alloy materials in each of the chambers 62A 1-5, while maintaining the appropriate condition of the valves 180, 182, 184, 186 disposed in line between the chambers, so that the hydrogen is thermally pumped against the pressure to build its pressure up. As shown in the example in FIG. 3, the pressure can be increased from 21 psia to about 5100 psia when the hydrogen is absorbed and desorbed in five successive stages, with a three fold pressure increase between successive stages, with a temperature differential between the hot and cold water being less than 100° F.

Figure 4:
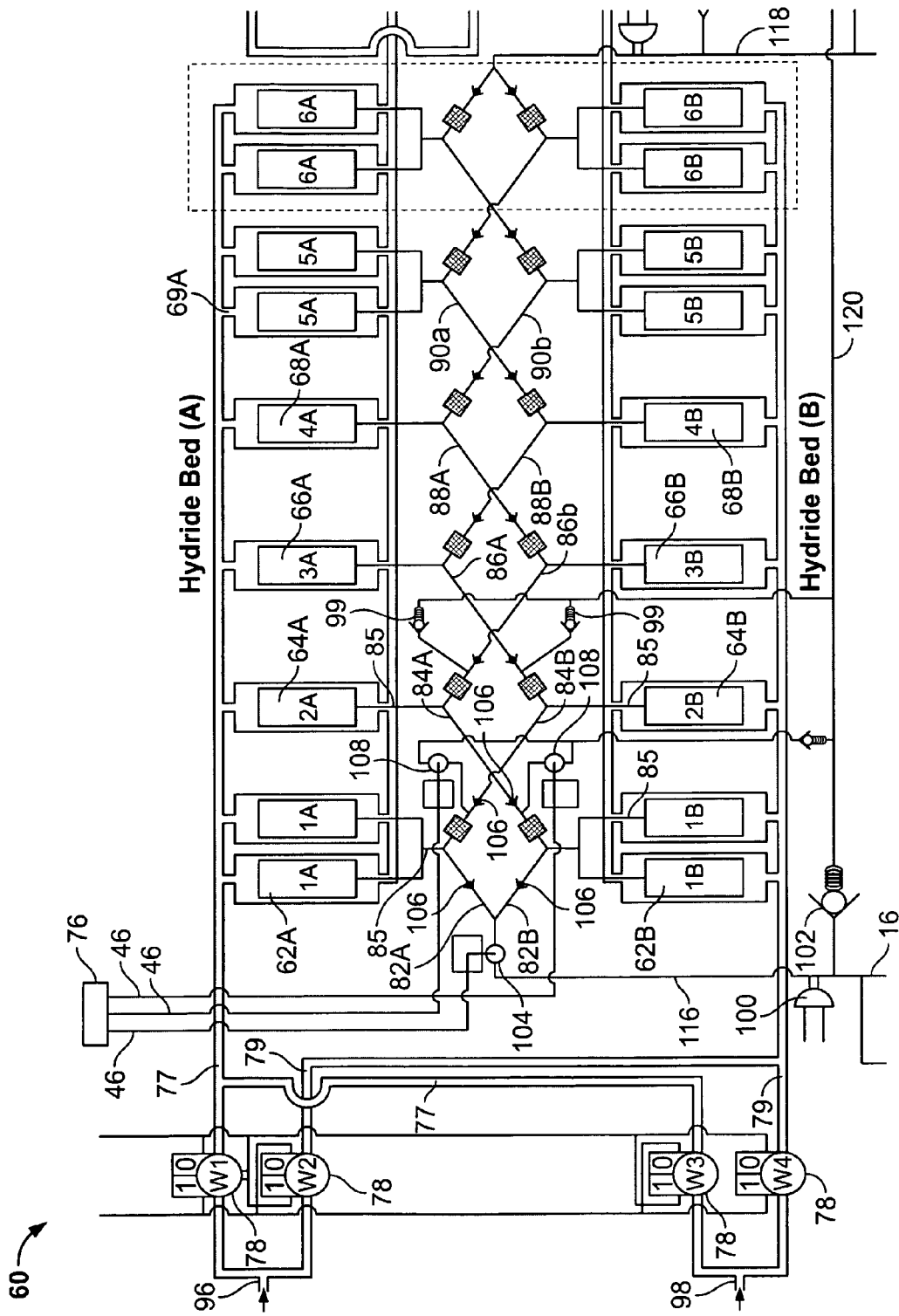
FIG. 4 illustrates in a schematic diagram the configuration of a thermal hydrogen compressor utilizing the hydrogen pressurizing system shown in FIG. 1 to produce high-pressure hydrogen according to this invention.

The multi-stage hydrogen gas thermal compressor 60 is shown in greater schematic detail in FIG. 4. The improvements provide a number of benefits, which include not only the compression of hydrogen gas, for example, by a tenfold increase in hydrogen gas pressure at each successive stage. Additional benefits derive from utilizing the invention described and claimed herein, resulting in more efficient, less expensive operation for providing an economical and commercially viable source of energy, for example, electrical energy, that is obtained by use of the hydrogen gas pressurized at ultra high pressures that may be used to drive, a turbine or hydraulic motor generator 30 as will be described below.

Referring now to FIG. 4, a hydrogen compressor system 60 according to the present invention, the structure of an inventive hydrogen gas compressor, utilizing the present invention, is described relative to its principles of operation. A thermal compressor system 60, as shown in FIG. 2, comprises three essential subsystems. A first subsystem comprises at least two sets of hydride beds, an A set, namely 62A, 64A, 66A, 68A and 70A, and a B set, namely 62B, 64B, 66B, 68B and 70B, including piping between them, as will be described below. Another essential subsystem is the hot and cold water circulation subsystems 72, 74, and the control subsystem CPU (not shown). Each of these known subsystems will be briefly described, but for a fuller, more elaborate description of the hydride heat exchange units, reference is made to the teaching of the aforementioned U.S. Pat. Nos. 4,402,187 and 4,505,120.

Each similarly numbered hydride bed pair, for example, hydride bed containers 62A, 62B and connecting pipes 82A, 82B comprise a heat exchange unit 62; and similarly the remaining hydride bed container pairs 64A, 64B together with pipes 84A, 84B comprise a second hydride heat exchange unit, and so on. The piping 82A, 82B, 84A, 84B etc. is interconnected, as will be described below. The first set of pipes 82A, 82B is connected to the hydrogen inlet by means of the internal inlet pipe 116. Inlet pipe 116 has disposed along it a low pressure switch 100 and a safety pressure, relief valve 102. The low pressure switch 100 will close off the inlet if pressure goes below a certain value, i.e., 15 p.s.i., and the pressure relief switch 102 will release incoming hydrogen gas if it exceeds a predetermined pressure value, e.g. 200 p.s.i.a. These values may be adjusted for uses in generating the high pressures according to the present invention, however, or the structures may be provided for use in high-pressure environments without an overpressure venting feature. Exposure of the piping 16, 116 to pressures below atmospheric pressure are to be avoided in that a negative pressure will lead to undesirably attract gaseous impurities from the ambient environment into the system 60. Likewise, if for some accidental reason the hydrogen gas pressure within the inlet pipe exceeds a safe or expected pressure, the pressure relieve valve will vent the hydrogen to a vent stack for the processing, as will be described below.

Further along the inlet pipe 116, there is disposed a hydrogen cut off valve 104 such as a solenoid valve, which is controlled by the CPU through electrical control connections (not shown). The valve 104 opens and closes in accordance with the cycle timing of the remainder of the compressor arrangement 60 to introduce hydrogen gas into the system for compression, as needed. Of course, in a closed system, for example, such as that shown in FIG. 1, no hydrogen gas would be vented and there would be no need for adding any hydrogen to the system for further processing.

Thermal compressors provide great benefits, as they are typically about one tenth the mass of and smaller than conventional mechanical compressors sized to the same hydrogen flow rates and compression ratios. For example, a thermal compressor designed to compress hydrogen from 100 psia to 5,000 psia (CR=50), with a hydrogen flow rate of 1,000 SCFH, will have a total compressor mass of about 115 kg, while the mass of an equivalent mechanical compressor is over 1,300 kg. Thermal compressors with hydrogen compression ratios greater than 1,000 and hydrogen flow rates greater than 10,000 SCFH can be provided on a custom basis.

FIG. 4 shows as an alternative embodiment of a thermal powered hydride heat compressor for increasing the pressure as an example of a hydride alloy absorbing hydrogen at 565 psia pressure when at 25° C. and discharging hydrogen at 1,700 psia when heated to 75° C. The description of the hydrogen compressor system 60 is mostly conventional. Within each of the piping 82A, 82B, each connected to the inlet pipe 116, is a one-way check valve 106, which opens only when the hydrogen gas pressure on the side of inlet pipe 116 is greater than that of the piping 82A, 82B. Thus, as the hydrogen is delivered downstream, i.e., from heat exchange unit 62 toward unit 64 and on wards, the pressure of the hydrogen within the first heat exchange unit 62 will fall below the normal gas pressure present in the inlet pipe 116. For the most part, each hydride bed pair 64A, 64B; 66A, 66B; 68A, 68B, etc. has as a hydrogen source the immediately adjacent upstream bed, and a connection provided by, for example, hydrogen inlet pipes 82A, 82B; 84A, 84B; etc. The inlet pipes 82A, 82B provide a path for the hydrogen 85 to the hydride bed within each of the containers, 64A, 64B, 66A, 66B, etc. As the cold water and hot water are cycled from one series of beds, e.g., from the A series to the B series, the hydrogen is compressed at each stage until it reaches the internal outlet pipe 118, connected to outlet pipe 18 (FIG. 1). The process of hydrogen gas compression is described in aforementioned U.S. Pat. Nos. 4,402,187 and 4,505,120, incorporated by reference, and review of those patents and others set forth above is recommended for a more detailed description.

An optional feature utilizable in the embodiment of hydrogen compressor 60 shown in FIG. 2 is a hydrogen 108 vent, the opening and closing of which is controlled by the CPU (not shown), through an electrical connection 110 extending therebetween. The timing of the opening and closing of hydrogen vents 108 is most conveniently and efficiently done during the periods immediately prior to the switchover of the hot and cold water streams, that is, at the time that the bed which was in contact with the cold water is switched to hot water. At this time, the hydrogen absorption/desorption occurring in the first two metal hydride beds 62A, 62B, approaches equilibrium, and so that the hydrogen pressure of the pipes 82A, 82B is not at a maximum.

Venting is directed by the controller CPU as it receives a signal of the pressure differential within the piping 82A, 82B. The CPU signals the hydrogen vent 108, which is opened for at most one to two seconds. Any impurities entrained within the hydrogen gas, pressurized at about 30-40 p.s.i., are ejected into the exit vent pipe 114, which connects to a central vent stack 120. The vent stack itself may be connected to a disposal site for the "impulse" hydrogen gas, where it may be burned off, for example, in a hot water heater for providing otherwise waste heat for the useful purpose of heating the hot water utilized in the compressor 60.

In the period when the maximum hydrogen is absorbed in the metal hydride beds 62A, 62B, the hydrogen therein is almost pure, whereas the hydrogen in the piping 82A, 82B is relatively impure. Makeup hydrogen is available from the source, and in expelling the "impure" hydrogen gas during each throughput cycle, a larger relative proportion of the impurity gases is expelled than of the hydrogen gas within the system. That is, after the vents 108 are closed and the hydrogen gas is desorbed, the remaining hydrogen in pipes 82A, 82B includes fewer impurities than before the venting process because the makeup hydrogen in the next aliquot received from the source 14 will have relatively less impurities than the hydrogen gas vented through vents 108. The venting process may be utilized during every cycle, or $V_2$ cycle, so that if desired, impurity gases will not build up in the system thereby avoiding ultimate saturation of the desiccant material.

For example, vents (not shown) may be inserted in pipes 84A, 84B, and may be controlled by a central processing unit (not shown) to vent a second aliquot of hydrogen gas that may have included some minor level of impurities. The vented hydrogen gas does not necessarily translate into waste, however, because of the transformation of hydrogen gas that may have impurities to a pure hydrogen gas stream, which is more valuable commercially than wet or impure hydrogen. Moreover, burning of vented hydrogen in a stack to heat water that can be used to further pressurize the hydrogen in the compressor arrangement 60 or for other use, for example, to produce fuel savings and provide a self-generating energy source to the system.

Figure 5:
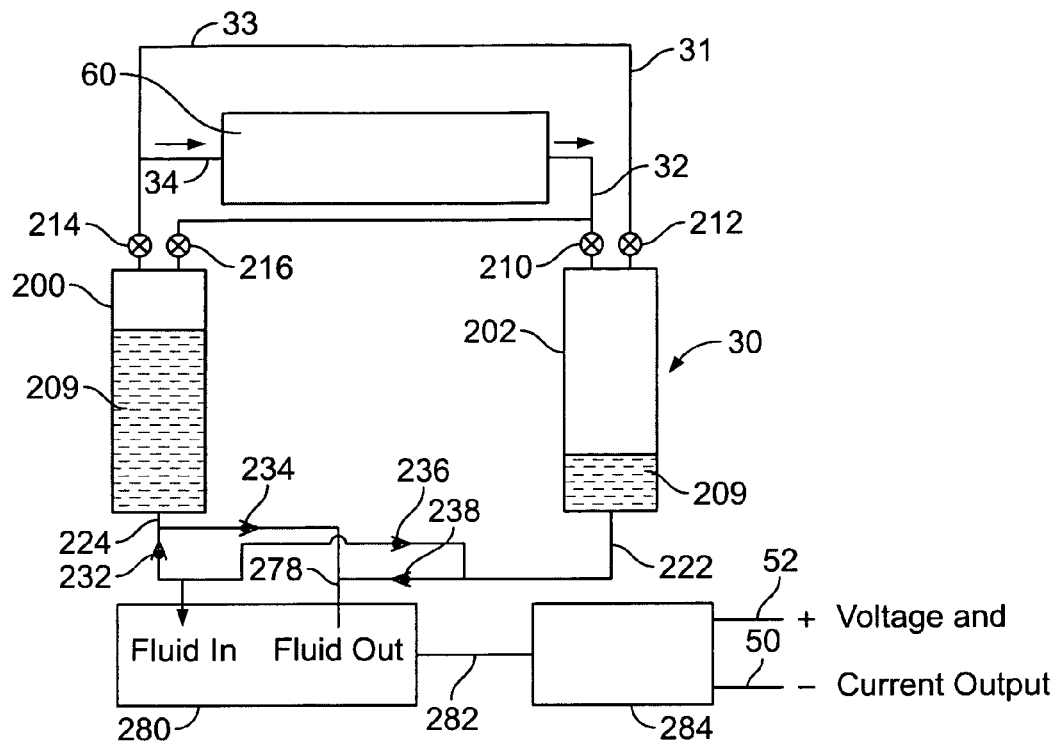
FIG. 5 is a detailed schematic diagram of the hydraulic motor generator mechanism according to the present invention, for providing electricity utilizing a high-pressure gas source.

In the thermal compressor 60, hydrogen gas is absorbed in a reversible metal hydride alloy in the hydride bed 62A at low pressure in a water-cooled container. The container is subsequently heated with hot water, which releases the hydrogen gas at a higher pressure. Continuous compression is achieved with two identical containers in a parallel configuration; one container cooled by water absorbs hydrogen while the other is heated with hot water to release hydrogen at the same rate. The cool and hot water streams in pipes are periodically switched by ball valve switches 78 so that water flowing through one set of pipes 77 switches to the other set of pipes 79, and vice versa and the simple check valves 106 keep hydrogen gas moving through the compressor. In a second embodiment, hydrogen gas purification is a feature which may be used in any of a number of applications, such as ring manifold type heat exchangers, as described in aforementioned U.S. Pat. No. 5,623,987, in air conditioners utilizing metal hydrides, described in U.S. Pat. No. 5,450,721, and in other heat exchange devices, such as described in U.S. Pat. No. 4,781,246, used in refrigerators, heat pumps, and low pressure hydrogen storage devices. Referring now to FIG. 5, the hydraulic motor assembly 30 shown in FIG. 1 is described in greater detail. Two hydraulic chambers 200 and 202 are driven by the high hydrogen gas pressure provided by the compressor, and appropriate control of the solenoid hydrogen valves 210, 212 and 214, 216 provide the continual pressure on the hydraulic fluid within the chambers 200, 202 to drive a hydraulic motor. The hydraulic fluid is in fluid communication with the hydraulic motor 280 by means of a set of pipes 222, 224, and hydraulic valves 232, 234, 236, 238 control the flow of the hydraulic fluid, in conjunction with the hydrogen valves 210, 212 and 214, 216, to drive the motor 280. The motor 280 in turn drives one or more shafts 282 connected to an electrical generator 284 that then produces electrical power that is drawn off through lead wires 50, 52.

The electrical power can then be utilized in a desired manner, for example, directly running any type of electrical device, or providing power to a shared power grid or by storing the power in an electrical storage device, such as a battery, or for the electrolysis of water, thus making hydrogen and oxygen in gaseous form. If electricity derived from the hydride heat engine output is used to electrolyze water to produce hydrogen and oxygen gas, then the hydrogen gas generated can be thermo-chemically reacted with carbon dioxide gas to produce carbon monoxide gas and water via the well known reaction shown in (1) below.

$$CO_2 + H_2 > CO + H_2O \qquad (1)$$

Once the carbon dioxide has been converted into carbon monoxide, then a modified Fischer-Tropsch process can be employed to react the hydrogen gas with the carbon monoxide gas in the presence of metal catalysts and metal oxide catalysts under conditions of heat and temperature to produce gaseous and liquid type fuels via the reaction (2) below.

$$CO + 2H_2 > -CH_2-(Chain) + H_2O \qquad (2)$$

The delta heat of formation of this reaction is about −165 kJ/mol, and the heat can be generated by the same heat source that provides the energy for the hydrogen compression can also produce the heart source for the electrolysis reaction. For example, if a solar source of low grade heat is utilized, the same source can be provided to the Fischer-Tropsch reaction as a self-sustaining heat source.

The chain of carbohydrate molecules can be as long as desired for obtaining the desired liquid or gaseous form of fuel and or other precursor uses. Some examples, without limitation, of the gaseous fuels that can be made using the Fischer-Tropsch reaction are methane, propane, butane, iso-propane, and others. Some examples of liquid type fuels that can be made in this using the reaction are ethanol, methanol, gasoline, diesel, kerosene and jet type fuels etc.

The catalytic metals and metal oxides that are available for use in the Fischer-Tropsch thermo-chemical reactions are any of the following: nickel, nickel oxide, copper, copper oxide, iron, iron oxide, chromium, chromium oxide, vanadium, vanadium oxide, platinum, palladium, silver, silver oxide, manganese, manganese oxide, cobalt, cobalt oxide, titanium, titanium oxide, zirconium, zirconium oxide and others.

Figure 7:
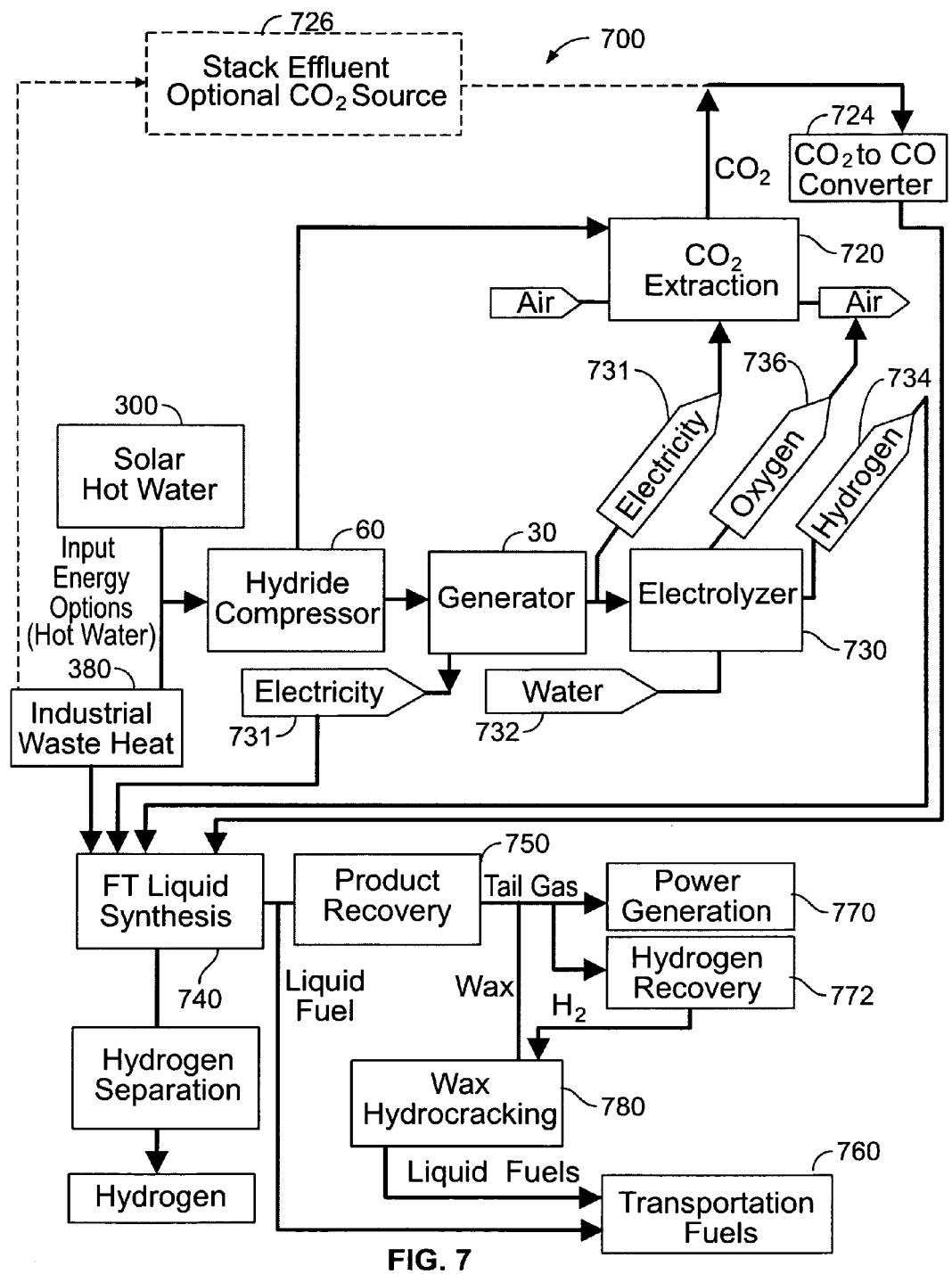
FIG. 7 is a process flow diagram illustrating the method steps of a conversion of solar energy into gaseous and liquid type fuels via the Fischer-Tropsch process.

FIG. 7 is an overall process flow diagram showing the various processes described proceeding form the collection of solar energy in the form of rays from the sun until the thermo-chemical reactions are completed to produce gaseous and liquid fuels. Solar thermal energy provides all the energy used for the generation of electric power, hydrogen and oxygen gas, $CO_2$ extraction from the ambient air and the production of carbon-neutral liquid fuels. None of the processes generate any net amounts of $CO_2$ or any other un-desirable greenhouse gases in the course of the liquid or gaseous fuel synthesis. The only "waste product" might be considered to be water vapor, but it is also possible to recover any waste by-product such as water and also to use it as a feed stock for the water electrolysis hydrogen generation process.

It is also contemplated that any additional water that may be needed for hydrogen gas generation can be extracted from the ambient air in much the same way the $CO_2$ will be cooled, liquefied and then extracted. Therefore, solar plants utilizing the teachings of the present invention can be totally self sufficient, and are even anticipated to be able to produce excess liquid water that can be used to grow useful crops (via hydroponics) under the solar collectors themselves.

Figure 6:
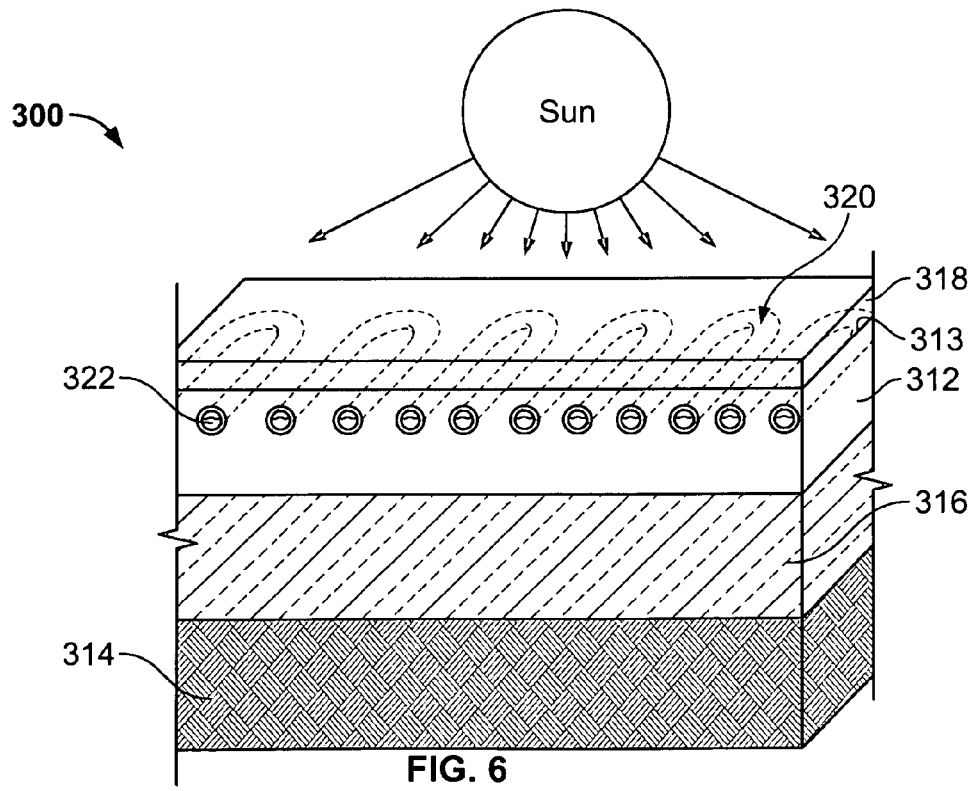
FIG. 6 is detail view of the solar collector isolated from the system shown in FIG. 1.

Referring now to FIG. 7, a flow chart diagram 700 of the processes is shown, starting with the solar collector or solar thermal hot water heater 300, also shown in cross-section in FIG. 6. The solar thermal hot water heater 300 provides a source of low-grade hot water. The low-grade solar thermal collector 300 provides a simple conversion of solar radiation into low-grade heat (hot water) to a temperature of between about 85° C. and 100° C. Using solar energy in this way is economical and the conversion of solar radiation energy into thermal (hot water) energy is better than 85% at 85° C. The cost can be as low as $0.03 per watt (thermal) of installed power, most of the cost after the initial installation being in the maintenance of the equipment.

The thermal energy generated by the collector 300 can be used to make electricity in a heat engine, such as in, or similar to, the one earlier described in the aforementioned '639 application. Alternatively, it can be used to facilitate space heating and air conditioning and/or thermodynamic reactions directly. Also, as shown by the broken lines in FIG. 7, an alternative source of hot water may be found in industrial waste heat 380 from an industrial or utility plant where the heat is otherwise let off into the environment, but can be can be retrieved.

Once the solar thermal energy has been collected by the solar water heater 300, it is sent out to the hydride compressor 60 and the hydrogen under high pressure can be used to power an electrical generator 30, all as is described above in relation to FIG. 1. The electricity generated by the generator a 30 is utilized to power a $CO_2$ Extraction unit 720, which may utilize the hydride cooling capacity of the cold or desorbing chambers 62A or 62B (FIGS. 2A, 2B and 4), as shown by the connection therebetween. The carbon dioxide extraction unit 720 may extract carbon dioxide from ambient air, thereby reducing the amount of carbon in the atmosphere. It is then sent to a converter unit 724, which reduces the carbon dioxide into a form ready for the Fischer-Tropsch process, that is, into a carbon monoxide (CO) and carbon dioxide mixture, utilizable to in the process.

The electricity generated by the generator 30 also goes to the other portion of the system, that is, to the electrolyzer 730 which utilizes the electricity 731 to combine with a source of water 732 to electrolyze the water in a known electrolysis process, thereby to produce a stream of hydrogen gas 734 and oxygen 736. The oxygen can be vented to the atmosphere as a waste product as shown, or can be reintroduced into a separate fuel cell (not shown) to produce electricity in a separate process, when needed. On the other hand, the hydrogen stream 734 is utilized further in the Fischer-Tropsch synthesis 740, to which it is directed by appropriate piping.

The flow diagram of FIG. 7 also utilizes CO or a CO—$CO_2$ mixture that is obtained either from the $CO_2$ to CO converter 720, or from a stack effluent 726 of a hydrocarbon sequestration device that is available and being used in some utility and conventional power generator devices. The CO—$CO_2$ mixture is also combined with hydrogen derived from the electrolyzer 730, and by possible input of either waste from an industrial waste heat source 380 or solar generated hot water from the solar collector 300, or heat that is generated by electricity taken form the generator 30. The elements required for a the Fischer-Tropsch synthesis are all available in an appropriate reactor vessel 740, and by known process parameters, desired forms of hydrocarbon a compound or compounds are drawn off and recovered in a product recovery step in, for example, a refining vessel 750, or alternatively, sent to a liquid fuel collector 760 for further processing as a transportation fuel such as gasoline, diesel or jet fuels.

Any tail gas or gaseous fuels may be utilized for appropriate purposes, for example, in power generation 770 or if the recovered gas is hydrogen 772, it can be used in further process steps, as shown. Further processing of any wax or heavy tar by products can utilize the hydrogen to form the compounds into solid hydrocarbons, such as waxes, etc. in a wax hydrocracking process 780, which if any liquid fuels result as by-products, can be utilized in the liquid fuel collection 760. Alternatively, the hydrogen that is recovered in the hydrogen recovery 772 may be reused by introducing it into the hydrogen stream 734 and diverting to the FT synthesis process 740.

Process flow diagram 700 shows one possible hydride liquefaction process 720 that could be used to economically extract the carbon dioxide from the ambient air, and it should be recognized that the CO or a CO—$CO_2$ mixture may be obtained by other means, for example, as a by-product of other industrial processes. However, it should be noted that the inventive process 700 requires only low grade heat to perform the carbon dioxide extraction, which can be supplied from solar energy 300 and/or waste heat sources 380.

Figure 8:
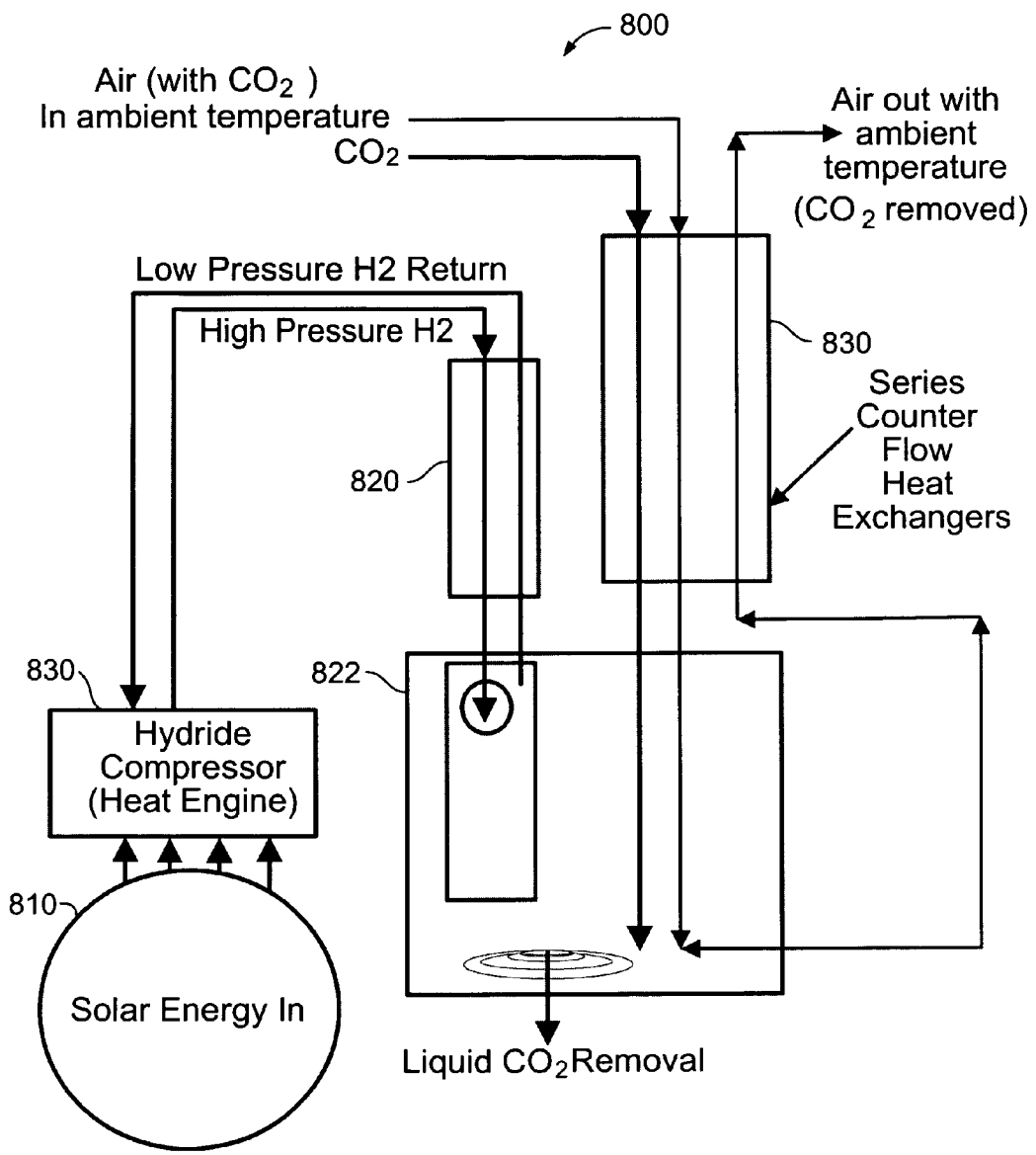
FIG. 8 is a schematic view of a process flow diagram in which the precursors of the modified Fischer-Tropsch process uses solar energy to economically extract carbon dioxide from the ambient air via a hydride/hydrogen liquefaction process; and The drawing figures are submitted for purposes of illustration of the preferred embodiments only and are not to be considered limiting of the invention as described below and claimed in the following claims.

FIG. 8 is a simplified diagram 800 of solar energy to fuel flow of a preferred process described above for FIG. 7. The efficiency conversion of each thermodynamic step involved in the conversion of solar radiation into electricity when a hydride heat engine conversion device is used as the heat to work converter is described above.

Using solar energy 810 in this way is an economical way to utilize solar energy as the conversion of solar radiation energy into thermal (hot water) energy is theoretically better than 85% at 85° C. Other portions of the process and system, for example, the electric power generator and shown in FIG. 5, are also a very low cost enterprise, the most significant cost being that of the solar collectors and the heat engine components. It is considered that to enable electric power generation in this way, the cost may be reduced to about $0.01 per kwh in direct electric power. This electric power can be used on site, sold to the grid, or can be used to electrolyze water to make hydrogen and oxygen gas, as previously described in the aforementioned applicants. The solar heated hot water is converted into high pressure gas energy, which is then passed through a turbine to extract usable shaft power, which in turn is used to produce electric power by turning an electric generator as described above in FIG. 5 relative to the power generator 30.

Referring again to FIG. 8, the hot water collector provides a multi-stage hydrogen pressurizing mechanism, comprising the hydride compressor 60, which directs the high pressure hydrogen to a heat exchanger 820 which when the hydrogen is decompressed, provides cooling to a cooling vessel 822, where air is cooled to the appropriate separation temperature. Low pressure hydrogen is then returned to the hydride compressor 60 in a continual process. The ambient cooled air is then processed in the cooling vessel 822 to extract the $CO_2$ in a cooled liquid form. Optionally, to reduce energy costs, Series counter flow heat exchangers 830 are used to start the cooling process of ambient air on it way into the cooling vessel 822, and the cool ambient air, without the carbon dioxide is passed thorough the exchangers 830 so as to begin the cooling process of the incoming air, and also to warm up the outgoing air before it is vented to the ambient environment, as shown.

The electric power produced from a solar heat engine can be used to electrolyze water to produce hydrogen and oxygen gas. Since water electrolysis is a well understood and established technology, the use of current electrolysis equipment to produce the hydrogen gas can be reduced to a cost near $1 per kg of hydrogen.

The hydride thermal compression technology used in the heat engine can also be used to generate very low temperature refrigeration and liquefaction through the expansion of the compressed gas via known Joule Thompson expansion processes in an efficient method to provide liquefied air first, and a means for separation of carbon dioxide after. The cold temperatures generated in this process will be used to liquefy the $CO_2$ directly out of the cold or liquid ambient air. After the $CO_2$ has been extracted from the air, the cold air will enter a counter flow heat exchanger where it will pre-cool the incoming ($CO_2$ containing) warm ambient air, thus greatly increasing the efficiency of this process. $CO_2$ "production" by this method is expected to cost less than $0.10 per kg of $CO_2$ extracted.

The generation of hydrogen gas via water electrolysis, and the extraction of $CO_2$ via liquefaction from air enable the production of liquid fuels via the known Fischer-Tropsch process. Initially, $CO_2$ is converted to CO using appropriate catalysts and heat. The CO then reacts with hydrogen in known reaction to make liquid fuels such as methanol and ethanol. By using the right catalyst almost any liquid fuel, including diesel, gasoline and jet fuels, can be produced by the process, when it is modified to provide the best reaction vehicle to obtain the desired fuels. Production of liquid jet fuels in this manner is expected to cost less than $2 per 100 k Btus of product fuel energy, and possibly as low as $1 per 100 k Btus. A most significant feature of the present invention, of course, is that it may be totally powered by solar energy, as it is converted into pressurized gas and electricity, without ever relying on any outside sources. In the process described, solar thermal energy provides all the energy used for the generation of electric power, hydrogen and oxygen gas, $CO_2$ extraction from the ambient air and the production of carbon-neutral liquid fuels. None of the processes generate any net amounts of $CO_2$ or any other un-desirable greenhouse gases.

The only "waste product" might be considered to be water vapor, but the plan is to recover that also and use it as a feed stock for the water electrolysis hydrogen generation process. It is also anticipated that any additional water needed for hydrogen generation can be extracted from the ambient air in much the same way the $CO_2$ will be cooled, liquefied and then extracted. Therefore, these solar plants will be totally self sufficient, and are even anticipated to be able to produce excess liquid water that can be used to grow useful crops (via hydroponics) under the solar collectors themselves.

It is further anticipates that using a further variation of the Fischer-Tropsch process can generate waxes, tars and even solid carbon-hydrogen "fuels" that will permanently sequester the carbon they contain (which $CO_2$ was originally removed from the ambient air). These solid fuels can be buried in the ground, or made into pavement, resulting in a net removal of $CO_2$ from the ambient air, and thus provide a start to the reversal of the global warming processes that are affecting the present environment.

The invention has been described in connection with preferred embodiments. It will be understood that modifications may be made to the invention while retaining the general scope and teaching of the invention herein. For example, while a solar energy collector 12 has been described as providing the source of hot water for use in driving the multi-stage hydride compressor 60, it is possible to drive the compressor with another type of heat source, or even a source of heat that otherwise is expelled or vented to the environment. For example, such a heat source may operate in pipes that are embedded in a medium that heats up naturally for portions of the day, but may produce waste heat that is otherwise not used for any productive purpose. Such pipes may be embedded in, for example, an asphalt driveway, or may be arrayed on the roof of a building within asphalt shingles configured for the purpose. Alternatively, hot water heating panels may be arrayed so as to provide shade and thereby avoiding heating up the roof. Other types of waste heat sources may be used to recapture the waste heat that would otherwise be dissipated into the environment and transfer the heat energy into energy, for example, electrical power, that may be immediately used as needed or that may be stored for later use, for example, in hydrogen storage vessels commercially available form HERA USA, Inc. of Ringwood, N.J., USA.

Thus, the invention illustrated and described in the above embodiments is thus understood to be for exemplary purposes only, and is not to be limited by the examples of the embodiments shown and described therein, but the invention is to be limited only by the elements and limitations recited in the following claims and their equivalents.

What is claimed is:

1. A system for conversion of electrical energy into gaseous and liquid fuels, comprising:
    a) a collector of carbon dioxide gas from a carbon dioxide gas source;
    b) a reducing device for reducing at least a portion of the collected carbon dioxide gas to carbon monoxide;
    c) a hydrogen producing device for providing hydrogen available from a hydrogen source;
    d) a vessel for thermo-chemically reacting the hydrogen gas with carbon dioxide in a Fischer-Tropsch process in the presence of a catalyst and heat, thereby to provide a hydrocarbon fuel, wherein the collector for collecting carbon dioxide gas further comprises a cooling vessel in association with a heat exchanger that removes heat when high pressure hydrogen is depressurized.

2. A system for conversion of electrical energy into gaseous and liquid fuels according to claim 1 wherein the device for producing hydrogen further comprises an electrolyzer.

* * * * *